Nov. 26, 1935.  A. L. HAMPTON  2,022,197
FLUID MOTOR
Filed Feb. 8, 1932    2 Sheets-Sheet 1

Inventor
Audrey L. Hampton

By
Hardway Cathey
Attorneys

Nov. 26, 1935.   A. L. HAMPTON   2,022,197
FLUID MOTOR
Filed Feb. 8, 1932   2 Sheets-Sheet 2
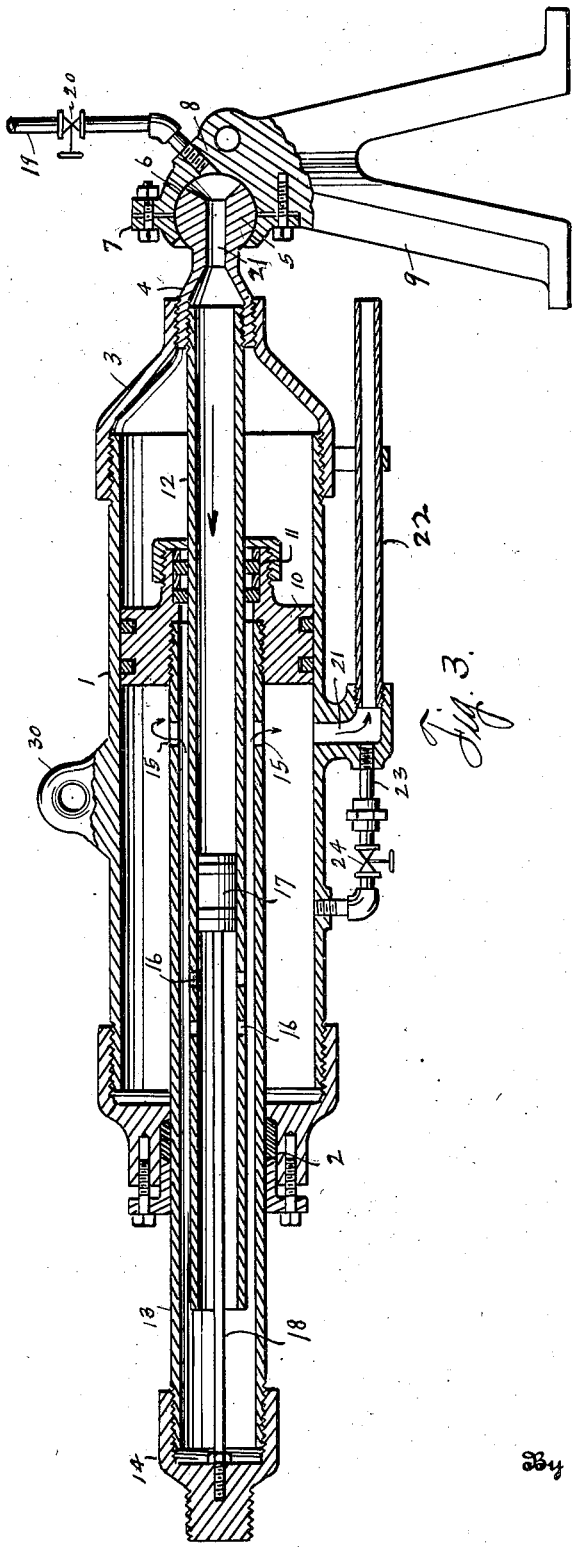
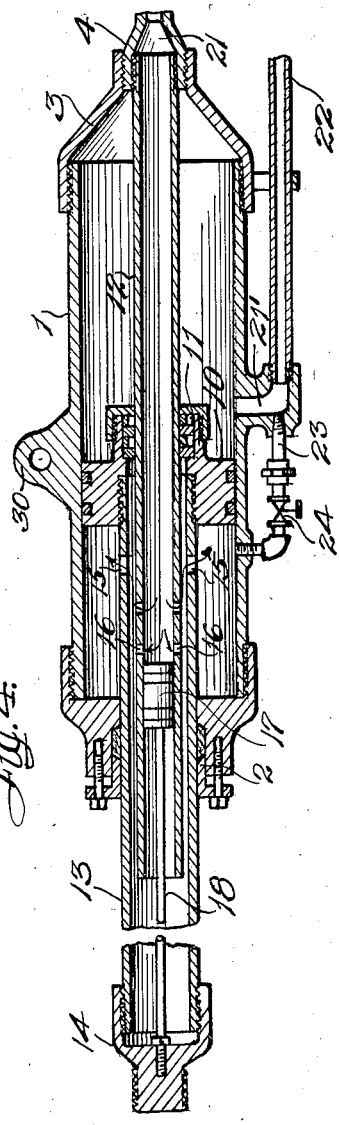
Inventor
Audrey L. Hampton
By Hardway Cathey
Attorneys Patented Nov. 26, 1935

2,022,197

UNITED STATES PATENT OFFICE 2,022,197

FLUID MOTOR

Audrey L. Hampton, Houston, Tex.

Application February 8, 1932, Serial No. 591,519

6 Claims. (Cl. 121—101)

This invention relates to a fluid motor.

An object of the invention is to provide a fluid motor having work engaging means arranged to be reciprocated by an operating fluid under pressure.

Another object of the invention is to provide a fluid motor having novel means for controlling the application of the operating fluid.

With the above and other objects in view this invention has particular relation to certain novel features of construction, operation and arrangement of parts, an example of which is given in this specification and illustrated in the accompanying drawings, wherein:—

Figure 3 shows a longitudinal sectional view thereof showing the parts as positioned at the end of the work stroke, and Figure 4 shows a longitudinal sectional view showing the parts as positioned at the beginning of the work stroke.

Figure 1:
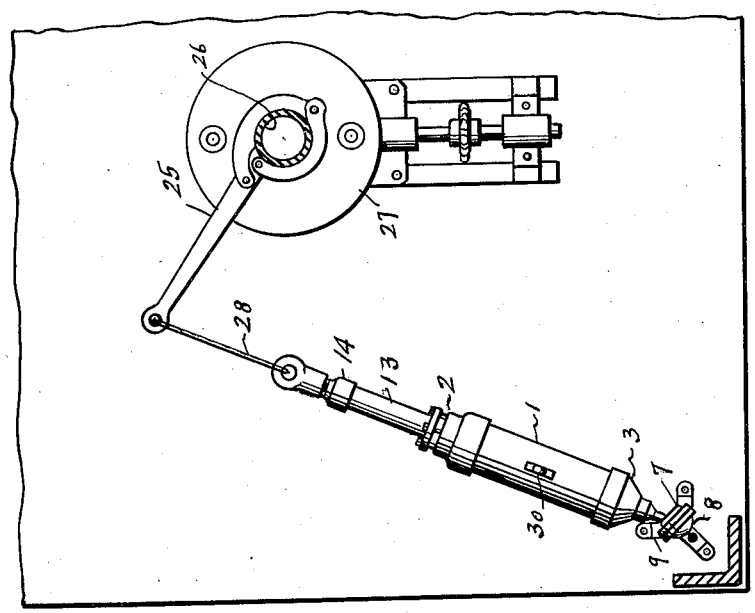
Figure 1 shows a plan view of the device as mounted on a derrick floor and connected to a pipe tong.

In the drawings the numeral 1 designates a cylinder, one end of which is equipped with a stuffing box 2 and whose other end has the end cap 3 screwed thereon. Threaded into the outer end of the cap 3 there is a tubular neck 4 whose outer end terminates in a ball joint member 5 which works in a socket 6 and is retained therein by the retainer plate 7. This socket 6 is formed in the head 8 supported on the tripod 9 which is mounted on a suitable support and the retainer plate 7 is bolted to said head.

In the cylinder 1 there is a piston 10 which is equipped with a suitable stuffing box 11. There is an inner cylinder 12, one end of which is anchored to the neck 4 and this cylinder 12 is fitted through the stuffing box 11 and is extended out beyond the opposite end of the cylinder 1. Anchored to the piston 10 and working through the stuffing box 2 there is a tubular piston rod 13 which surrounds and is spaced from the inner cylinder 12 and to the outer end of the piston rod 13, and closing said end, a head 14 is attached.

Adjacent the piston 10, the piston rod 13 is provided with one or more ports as 15 and spaced outwardly beyond these ports are the ports 16 through the wall of the inner cylinder 12.

There is a plunger 17 which works in the inner cylinder 12 and a plunger rod 18 is attached at one end to said plunger and at its other end to the head 14.

A supply line 19 for pressure fluid such as steam, enters the head 8 and is controlled by a suitable valve 20 through which pressure fluid may be supplied to the cylinder 12 through the passageway 21 through the neck 4. The outer end of this passageway 21 is flared so that the passageway 21 will not be closed by the movement of the ball joint member 5 in the socket 6 as the apparatus is adjusted into different positions.

There is a relief pipe 23 connected into the exhaust passageway 21' and also connected into the cylinder 1 in front of said exhaust passageway and this bypass pipe is equipped with valve 24 by means of which it is normally closed. In case of an overload sufficient to stall the piston 10 before it has completed its rearward movement and it be desired to relieve the pressure in front of said piston 10 the valve 24 may be opened for this purpose, preparatory to another forward movement of said piston.

As illustrated in Figure 1 the free end of the piston rod 13 is connected to the handle of a pipe grip tong 25 which is shown as applied to the casing or pipe 26 shown in connection with the conventional rotary drilling machine 27. The piston rod 13 is connected to the tong handle in this instance by flexible cable 28. As illustrated in Figure 1 the apparatus is mounted to be used for breaking up the string of pipe 26 as said string is withdrawn from the bore. When used for this purpose, upon the admission of steam, or other pressure fluid, through the passageway 21 and into the cylinder 12, said fluid will operate against the plunger 17 to drive the same forwardly, that is, to the left, as illustrated. Since there is very little load on the head 14, upon such movement, the plunger 17 will over run the ports 16, 16. Fluid under pressure will then pass through the ports 16 and enter the tubular piston rod 13 and will also pass through the ports 15 and into the cylinder 1. On account of the relative volumes of the tubular piston rod 13 and the cylinder 1, and the throttling effect of the ports 16, 15, some time will elapse before the pressure in the piston rod 13 and cylinder 1 begins to move the piston 10 to the right, and during that time, the plunger 17 will pass somewhat beyond, or to the left of the ports 16. As the piston 10 moves to the right, the plunger 17 will cut off the ports 16 and the expanding force of the steam, or other pressure fluid, will move the piston 10 to the right to uncover the exhaust passageway 21'. As soon as the pressure fluid exhausts, the pressure acting against the plunger 17 will again move it to the left and as there is no substantial load to be moved by the plunger 17, as it moves to the left, it will again over run the ports 16, and the above cycle will be repeated. Upon movement of the piston 10 forwardly, or to the left, when it covers the exhaust passageway 21', the steam trapped ahead of the piston will act as a cushion. This steam, however, will not be under high compression, and also will condense somewhat so that the piston may move forwardly far enough to permit the operation as above stated, and likewise, when the piston 10 moves to the right, it is moving under the influence of the pressure of the operating fluid behind it, and consequently will be carried somewhat beyond the outlet passageway 21' in its movement to the right before full force of the pressure fluid has escaped through the passageway 21'. The air trapped in the cylinder to the right of the piston 10 will be placed under compression and will act as a cushion for the piston 10.

Figure 2:
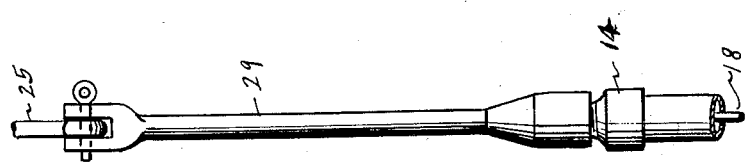
Figure 2 shows a fragmentary side view of a modified form of the device.

As illustrated in Figure 2 the piston 13 is connected to the free end of the tong handle by means of a rigid connecting rod 29 but the operation of the apparatus is the same as hereinabove explained.

The apparatus may be used as well for screwing up joints of pipe as for breaking said joints by suitably applying the tong and connecting the fluid motor thereto for operating the tong to the right in case the connecting threads are right hand threads.

As is well known to those familiar with the art of well drilling, the tong 25 will usually be suspended in the derrick by any suitable appliance applicable for the purpose and a fluid motor may also be suspended by means of a wire or chain engaged in the eye 30.

The motor may be applied for moving heavy objects about the derrick floor by attaching the cable 28 or the rod 29 to the object and then suitably applying the fluid pressure to accomplish the desired purposes.

The drawings and description disclose what is now considered to be a preferred form of the invention by way of illustration only while the broad principle of the invention will be defined by the appended claims.

What I claim is:

1. In apparatus of the character described an outer cylinder and an inner cylinder anchored in the outer cylinder, a piston closely surrounding the inner cylinder and working in the outer cylinder, a plunger in the inner cylinder, a tubular piston rod anchored to said piston around and spaced from the inner cylinder, means connecting the plunger to said piston rod, means through which pressure fluid may be admitted into said inner cylinder, said inner cylinder having a port arranged to be cleared by the plunger, when the latter is moved forwardly to permit the admission of the pressure fluid into the space between the inner cylinder and piston rod and said piston rod having a port arranged to permit said admitted fluid to enter the outer cylinder in front of said piston, whereby the movement of the piston and plunger is reversed, said outer cylinder having an exhaust port arranged to be closed by the piston upon its forward movement and to be cleared by said piston upon its reverse movement.

2. In apparatus of the character described, an outer cylinder having an exhaust port, an inner cylinder therein anchored to said outer cylinder and having an inlet port, means for admitting pressure fluid into the inner cylinder, a piston in the outer cylinder around the inner cylinder, a piston rod around the inner cylinder connected to said piston, a plunger in the inner cylinder connected to the piston rod, sealing means forming a fluid tight joint between the outer cylinder and piston rod forming a pressure chamber between said piston and sealing means, said plunger and piston being movable simultaneously to open the inlet port and close the exhaust port and into another position to close said inlet port and open the exhaust port.

3. In an apparatus of the character described an outer cylinder having an exhaust port, an inner cylinder one end of which is anchored to one end of the outer cylinder, a stuffing box at the other end of said outer cylinder, a piston in the outer cylinder around the inner cylinder, a tubular piston rod attached to said piston, at one end, and whose other end is closed and works through said stuffing box, a plunger in said inner cylinder connected to said piston rod, inlet ports for the inner cylinder and piston rod, respectively, said plunger and piston being movable in one direction into position to open said cylinder inlet port and to close said exhaust port, means for applying pressure fluid, through said piston rod and port against said piston to move the piston and plunger in another direction to close said cylinder inlet port and to open said exhaust port.

4. Apparatus of the character described comprising an outer cylinder, an inner cylinder one end of which is connected to the corresponding end of the outer cylinder and provided with an inlet for pressure fluid and whose other end is open, a piston in said outer cylinder around the inner cylinder, a tubular piston rod around the inner cylinder whose inner end is attached to the piston and whose outer end is closed, means forming a seal between the piston rod and outer cylinder whereby a pressure shoulder is formed in said outer cylinder, a plunger in the inner cylinder, means connecting the plunger to the piston rod, said inner cylinder and said piston rod each having an inlet port and said pressure chamber having an exhaust port, said plunger and piston being movable into one position to close said exhaust port and to open said inlet ports whereby the pressure will be admitted into the open end of the inner cylinder and into said chamber and being movable into another position to open said exhaust port and to close said inlet ports.

5. Apparatus of the character described comprising an outer cylinder, an inner cylinder one end of which is connected to the corresponding end of the outer cylinder and provided with an inlet for pressure fluid and whose other end is open, a piston in said outer cylinder around the inner cylinder, a tubular piston rod around the inner cylinder whose inner end is attached to the piston and whose outer end is closed, means forming a seal between the piston rod and outer cylinder whereby a pressure shoulder is formed in said outer cylinder, a plunger in the inner cylinder, means connecting the plunger to the piston rod, said inner cylinder and said piston rod each having an inlet port and said pressure chamber having an exhaust port, said plunger and piston being movable into one position to close said exhaust port and to open said inlet ports whereby the pressure will be admitted into the open end of the inner cylinder and into said chamber and being movable into another position to open said exhaust port and to close said inlet ports, and a valve controlled bypass conduit leading out from said chamber.

6. Apparatus of the character described comprising an outer cylinder, an inner cylinder one end of which is connected to the corresponding end of the outer cylinder and provided with an inlet for pressure fluid and whose other end is open, a piston in said outer cylinder around the inner cylinder, a tubular piston rod around the inner cylinder whose inner end is attached to the piston and whose outer end is closed, means forming a seal between the piston rod and outer cylinder whereby a pressure shoulder is formed in said outer cylinder, a plunger in the inner cylinder, means connecting the plunger to the piston rod, said inner cylinder and said piston rod each having an inlet port and said pressure chamber having an exhaust port, said plunger and piston being movable into one position to close said exhaust port and to open said inlet ports whereby the pressure will be admitted into the open end of the inner cylinder and into said chamber and being movable into another position to open said exhaust port and to close said inlet ports and means for operatively connecting said piston rod to the work.

AUDREY L. HAMPTON.